(No Model.)

R. W. JESSUP.
SEED CLEANER.

No. 469,252. Patented Feb. 23, 1892.

Witnesses:
Geo. W. Ueffinger.
M. E. Gonzalez

Inventor.
Robert W. Jessup
By his W. H. Smyth
Atty.

THE NORRIS PETERS CO., PHOTO-LITHO., WASHINGTON, D. C.

UNITED STATES PATENT OFFICE.

ROBERT WEBSTER JESSUP, OF ALAMEDA, ASSIGNOR TO ELIZABETH W. JESSUP, OF LOS ANGELES, AND EUGENE F. ROGERS, OF SANTA BARBARA, CALIFORNIA.

SEED-CLEANER.

SPECIFICATION forming part of Letters Patent No. 469,252, dated February 23, 1892.

Application filed May 28, 1891. Serial No. 394,427. (No model.)

*To all whom it may concern:*

Be it known that I, ROBERT WEBSTER JESSUP, a citizen of the United States, residing in the town and county of Alameda, and State of California, have invented an Improved Seed-Cleaner, of which the following is a specification.

My invention relates to the class of machines used in separating seed of one kind from others and also for removing dirt and refuse.

The object of my invention is to provide a machine simple in construction, rapid and efficient in operation for removing dirt, refuse, &c., from seeds of various kinds, but particularly adapted to operate on Lima beans or seed of approximately similar section.

It consists of the devices and combination of devices hereinafter described, and particularly pointed out in the claims.

Figure 1:
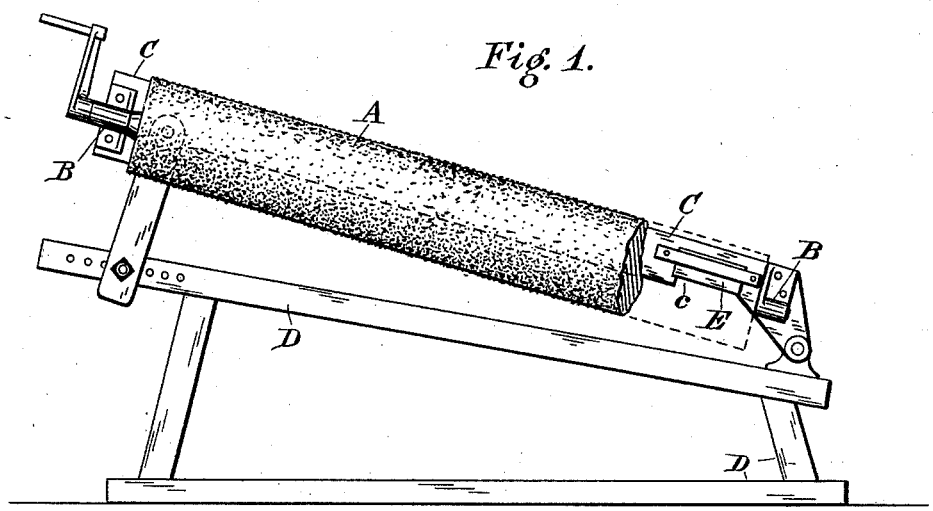
Figure 2:
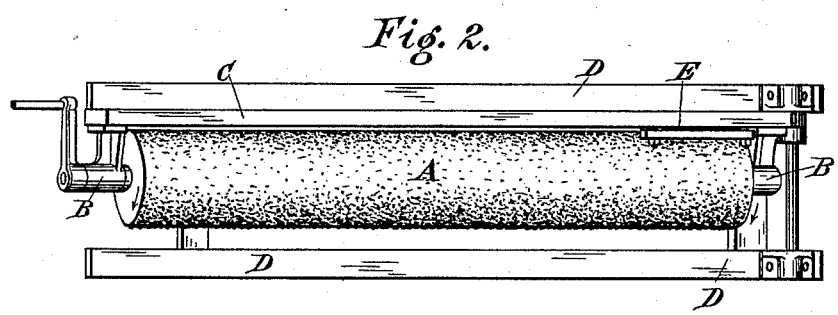
Figure 3:
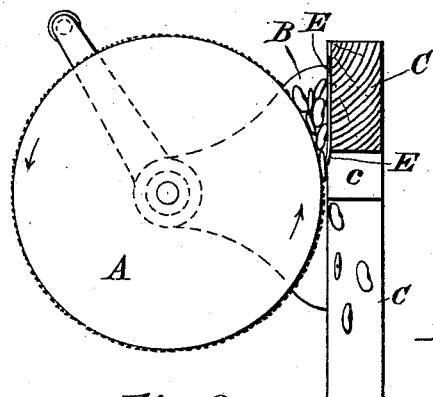

Referring to the accompanying drawings, Figure 1 is an elevation, portions being broken away to more clearly illustrate it. Fig. 2 is a plan. Fig. 3 is an enlarged partial end view, showing the position taken by the beans.

A is an inclined cylinder or roller, the surface of which is preferably roughened and journaled adjustably in frame B and provided with suitable power connections for rotating it. (Shown in the drawings for simplicity as a crank-handle.)

At one side of the cylinder A and almost touching it is secured a guide or plate C, set up edgewise, its length being approximately parallel to the roller A. The lower end of the guide C is notched, as shown at $c$, the notch being provided with an adjustable plate E, which can be set at various heights with relation to the lower edge of the guide C.

The operation of the device is as follows: The roller A being put in rotation in the direction indicated by the arrows, the seeds to be operated on are fed to the machine at the upper end of roller A, between it and the guide C, the motion of A, together with the inclination at which it and the guide C are set, causes the seeds to work down toward the lower end of cylinder A, and in so doing, owing to the oval section of the beans, they assume an upright position, as shown in Fig. 3, and in this position they continue downward till they reach the adjustable opening or notch $c$, through which they fall; but before the beans have reached the discharge notch $c$ the dirt and light refuse have been removed in the manner following: The fine dirt and sand of course fall directly through the narrow space between the roller A and guide-plate C, the twigs, straws, and refuse of like nature are caught by the roughened surface of the roller A, carried over and so removed, while stones and lumps of dirt or seeds of more spherical form are carried along and discharged at the end of A and guide C. Owing to the hard smooth nature of the surface of the beans, the roughened surface of rotating roller A has little or no tendency to carry them over.

Having now described my invention, what I claim as new, and desire to secure by Letters Patent, is—

1. In a seed-cleaner, the combination of an inclined rotating cylinder the surface of which is roughened and a guide-plate set contiguous thereto, having a notch which forms a discharge-opening, substantially as described.

2. In a seed-cleaner, the combination of an inclined rotating cylinder the surface of which is roughened, a guide-plate set contiguous thereto, forming approximately a V-shaped channel with the cylinder and having a notch which forms a discharge-opening, and any suitable means for regulating the size of this opening, substantially as described.

3. In a seed-cleaner, the combination of an inclined rotating cylinder having its surface roughened, guide-plate C, with its notch $c$, set contiguous to and forming V-groove with C, power connections for operating the rotating cylinder, and a suitable frame for supporting the various parts, substantially as described.

4. In a seed-cleaner, the combination of an inclined rotating cylinder adjustably journaled in a suitable frame to permit of the inclination being varied, a guide-plate C, having a notch $c$, provided with an adjustable discharge-regulator E, and suitable power connections for operating the cylinder, substantially as described.

ROBERT WEBSTER JESSUP.

Witnesses:
   GEO. W. UEFFINGER,
   M. E. GONZALEZ.